United States Patent
Hojeij et al.

(10) Patent No.: US 11,737,034 B2
(45) Date of Patent: Aug. 22, 2023

(54) METHOD AND APPARATUS FOR POWER DISTRIBUTION TO SUB-BANDS IN MULTIPLE ACCESS COMMUNICATIONS SYSTEMS

(71) Applicants: INSTITUT MINES-TELECOM, Palaiseau (FR); UNIVERSITE LIBANAISE, Beirut (LB); UNIVERSITE SAINT-ESPRIT DE KASLIK, Jounieh (LB)

(72) Inventors: Marie-Rita Hojeij, Mont Liban (LB); Charbel Abdel Nour, Brest (FR); Joumana Farah, Mont Liban (LB); Catherine Douillard, Brest (FR)

(73) Assignees: INSTITUT MINES TELECOM, Palaiseau (FR); UNIVERSITE LIBANAISE, Beirut (LB); UNIVERSITE SAINT-ESPRIT DE KASLIK, Jounieh (LB)

(*) Notice: Subject to any disclaimer, the term of this patent is extended or adjusted under 35 U.S.C. 154(b) by 160 days.

(21) Appl. No.: 16/982,007

(22) PCT Filed: Mar. 20, 2019

(86) PCT No.: PCT/EP2019/057010
§ 371 (c)(1),
(2) Date: Sep. 17, 2020

(87) PCT Pub. No.: WO2019/185430
PCT Pub. Date: Oct. 3, 2019

(65) Prior Publication Data
US 2021/0022088 A1 Jan. 21, 2021

(30) Foreign Application Priority Data
Mar. 28, 2018 (EP) .................................... 18305355

(51) Int. Cl.
*H04W 52/34* (2009.01)
*H04W 52/42* (2009.01)
(Continued)

(52) U.S. Cl.
CPC ......... *H04W 52/346* (2013.01); *H04W 52/42* (2013.01); *H04W 72/044* (2013.01); *H04W 72/542* (2023.01)

(58) Field of Classification Search
None
See application file for complete search history.

(56) References Cited

U.S. PATENT DOCUMENTS

2007/0258352 A1* 11/2007 Wang .................... H04L 1/0057
370/203
2008/0279142 A1* 11/2008 Kim ...................... H04W 52/42
370/329
(Continued)

FOREIGN PATENT DOCUMENTS

EP 3 273 736 A1 1/2018

OTHER PUBLICATIONS

Hojeij, et al., "New Optimal and Suboptimal Resource Allocation Techniques for Downlink Non-orthogonal Multiple Access", WiPerComm, Springer, vol. 87, No. 3, pp. 837-867, May 10, 2015.
(Continued)

*Primary Examiner* — Jutai Kao
(74) *Attorney, Agent, or Firm* — BakerHostetler

(57) ABSTRACT

A method and system for assigning power to sub-bands in a multiple access communications system, where users are assigned iteratively to sub-bands, and at each iteration a provisional partial power budget is determined for the subset of sub-bands comprising the sub-bands to which users have been assigned in the present time slot and the sub-band under consideration in the sequence, where the fraction of
(Continued)

the total available power determined as the provisional partial power budget corresponds to the fraction of the number of sub-bands in the subset from the total number of sub-bands to be assigned, and the provisional power allocation for the sub-band under consideration is obtained by performing a waterfilling distribution of the provisional partial power budget amongst the subset of the sub-bands, based on the channel gain of the users already assigned to sub-bands in the present time slot.

8 Claims, 6 Drawing Sheets

(51) Int. Cl.
 H04W 72/044 (2023.01)
 H04W 72/542 (2023.01)

(56) References Cited

U.S. PATENT DOCUMENTS

2017/0303276 A1* 10/2017 Cheng ............... H04W 28/0236
2018/0103442 A1* 4/2018 Janse van Rensburg ....................
 H04W 52/42

OTHER PUBLICATIONS

Endo, et al., "Uplink Non-orthogonal Access with MMSE-SIC in the Presence of Inter-cell Interference", Proc. 2012 IEEE Int. Symp. on. Wireless Commun. Syst, 2012.

Saito, et al., "System-Level Performance Evaluation of Downlink Non-orthogonal Multiple Access (NOMA)", 2013 IEEE 24th Annual International Symposium on Personal, Indoor, and Mobile Radio Communications (PIMRC), 2013.

Benjebbour, et al., "System-Level Performance of Downlink NOMA Combined with SUMIMO for Future LTE Enhancements", 2013 IEEE Globecom Workshops (GC Wkshps), 2013.

Benjebbour, et al., "Concept and Practical Considerations of Non-orthogonal Multiple Access (NOMA) for Future Radio Access", 2013 International Symposium on Intelligent Signal Processing and Communication Systems, 2013.

Otao, et al., "Performance of Non-orthogonal Access with SIC in Cellular Downlink Using Proportional Fair-Based Resource Allocation", 2012 International Symposium on Wireless Communication Systems (ISWCS), pp. 476-480, 2012.

TSE, "Fundamentals of Wireless Communication", Cambridge University Press, pp. 267-285, 2005.

Saito, et al., "System-Level Performance of Downlink Non-orthogonal Multiple Access (NOMA) Under Various Environments", 2015 IEEE 81st Vehicular Technology Conference (VTC Spring), 2015.

* cited by examiner

METHOD AND APPARATUS FOR POWER DISTRIBUTION TO SUB-BANDS IN MULTIPLE ACCESS COMMUNICATIONS SYSTEMS

CROSS-REFERENCE TO RELATED APPLICATIONS

This application is a National Stage of International patent application PCT/EP2019/057010, filed on Mar. 20, 2019, which claims priority to foreign European patent application No. EP 18305355.2, filed on Mar. 28, 2018, the disclosures of which are incorporated by reference in their entirety.

FIELD OF THE INVENTION

The present invention relates to the attribution of power in multiple access communications system such as Orthogonal Multiple Access (OMA) and Non-Orthogonal Multiple Access (NOMA).

BACKGROUND OF THE INVENTION

With the proliferation of internet applications, it is expected that the mobile traffic volume supported by communication networks by 2023 will be 10 times larger than that supported today. To respond favorably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access. By exploiting an additional multiplexing domain, the power domain, NOMA allows the cohabitation of multiple users per sub-band at the transmitter side, on top of the Orthogonal Frequency Division Multiplexing (OFDM) layer, and relies on Successive Interference Cancellation (SIC) at the receiver side. An attractive feature of NOMA is that it targets the improvement of system capacity while achieving user fairness. Therefore, most of the prior art dealing with NOMA considers the proportional fairness (PF) scheduler as a multiuser scheduling scheme for the trade-off between total user throughput and the user fairness that it provides. Several power allocation algorithms, jointly implemented with a NOMA-based PF scheduler, have been proposed in recent research literature.

In "Uplink non-orthogonal access with MMSE-SIC in the presence of inter-cell interference" by Y. Endo, Y. Kishiyama, and K. Higuchi. in proc. 2012 IEEE Int. Symp. on. Wireless Commun. Syst, 2012, an inter-cell interference-aware transmission and power control mechanism is proposed and conducted in two steps, followed by user selection based on the PF metric. In the first step, the transmission power of a user per sub-band is determined by the fractional transmit power control (FTPC) used in LTE (acronym for Long Term Evolution, a $4^{th}$ generation wireless broadband technology developed by the $3^{rd}$ Generation Partnership Project, 3GPP). The power is then updated in a second step by taking into consideration the candidate set of scheduled users. Simulation results show that NOMA combined with the proposed power allocation greatly enhances the system-level throughput, compared to orthogonal access.

In "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015, the system level-performance of downlink NOMA in small cells is investigated, where the full search power allocation scheme in "System-Level Performance of Downlink NOMA Combined with SUMIMO for Future LTE Enhancements", by A. Benjebbour, A. Li, Y. Kishiyama, H. Jiang, and T. Nakamura, in proc. IEEE Globecom, December 2014 is conducted within the PF scheduler, in order to select the best combination of user pairs and power allocations. Some of the recently proposed power allocation algorithms for NOMA do not consider an equal inter-sub-band power distribution, while others propose different multiuser power allocation schemes with an equal distribution of power among sub-bands.

In "System-level performance evaluation of downlink non-orthogonal multiple access (NOMA)", by Y. Saito, A. Benjebbour, Y. Kishiyama, and T. Nakamura, in proc. IEEE PIMRC, September 2013, and "A Concept and practical considerations of non-orthogonal multiple access (NOMA) for future radio access", by. Benjebbour, Y. Saito, Y. Kishiyama, A. Li, A. Harada, A, and T. Nakamura, in proc. Int. Symp. on Intelligent Signal Process. and Commun. Syst. (ISPACS), 2013, the fractional transmit power allocation (FTPA) is introduced in order to split power among multiplexed users, while power per sub-band is considered to be constant over all frequency blocks. In "Performance of non-orthogonal access with SIC in cellular downlink using proportional fair-based resource allocation", N. Otao, Y. Kishiyama, and K. Higuchi, in proc. Int. Symp. on Wireless Commun. Syst. 2012, pp. 476-480, power is also maintained constant for all sub-bands, but an optimal power allocation method based on iterative waterfilling is used to allocate power among scheduled users on each sub-band.

If a downlink system with single transmitter and receiver antenna is considered, the system consists of K users per cell, with a total system bandwidth B divided into S sub-bands, and a maximum allowable transmit power Pmax by the Base Station. Among the K users, a set of users Us={k1, k2, ..., $k_n$, ..., $k_{n(s)}$}, is selected to be scheduled over each frequency sub-band s, (1≤s≤S). n(s) indicates the number of users non-orthogonally scheduled at sub-band s. The SIC process as described in Fundamentals of Wireless Communication, Cambridge University Press, 2005 by D. Tse, and P. Viswanath, is conducted at the receiver side, and the optimum order for user decoding is in the increasing order of the users' squared channel gains normalized by the noise and inter-cell interference $$\frac{h_{s,k_n}^2}{n_{s,k_n}}$$

where $h_{s,k_n}$ is the equivalent channel gain, at sub-band s, between user $k_n$ and the BS, and $n_{s,k_n}$ the average power of the received Gaussian noise plus intercell interference by user $k_n$. Assuming successful decoding and no SIC error propagation, and supposing that inter-cell interference is randomized such that it can be considered as white noise, the throughput of user $k_n$, at sub-band s, $R_{s,k_n}$, is given by:

$$R_{s,k_n} = \frac{B}{s}\log_2\left(1 + \frac{h_{s,k_n}^2 P_{s,k_n}}{\sum_{k_j \in U^s, \frac{h_{s,k_n}^2}{n_{s,k_n}} < \frac{h_{s,k_j}^2}{n_{s,k_nj}}} h_{s,k_n}^2 P_{s,k_j} + n_{s,k_n}}\right) \quad \text{Eq. (1)}$$

Where

K is the number of users per cell

B is the total system bandwidth $k_n$ is a user n of K

N is the number of users non-orthogonally scheduled on a sub-band.

$U^s = \{k_1, k_2, \ldots, k_n, \ldots, k_N\}$, is the set of users selected to be scheduled over each frequency sub-band $k_j$ considers the users of $U^s$ having a channel gain greater than $k_n$ S is the number of sub-bands in the system, s is the sub-band under consideration ($1 \leq s \leq S$).

$P_{max}$ is the maximum allowable transmit power $$\frac{h_{s,k_n}^2}{n_{s,k_n}}$$

is the squared channel gain observed by user $k_n$, normalized by the noise and inter-cell interference where $h_{s,k_n}$ is the equivalent channel gain at sub-band s, between user $k_n$ and the base station BS, and $n_{s,k_n}$ the average power of the Gaussian noise plus intercell interference received by $k_n$, at sub-band s, and $R_{s,k}(t)$ represents the throughput of user k on sub-band s.

The transmit power allocation constraint is represented by $$\sum_{s=1}^{S} P_s = P_{max}, \text{ with } P_s = \sum_{n=1}^{n(s)} P_{s,k_n} \quad (2)$$

Where $P_s$ denotes the amount of allocated power on sub-band s.

Since the scheduler in NOMA may allocate a sub-band to more than one user simultaneously, the user scheduling policy and the power allocation algorithm largely affect system efficiency and user fairness. A "Proportional Fairness" (PF) scheduler is known to achieve a good trade-off between these two metrics.

The objective of the PF scheduler is to maximize the logarithmic sum of user throughputs or, equivalently, long term averaged user rates, in order to ensure balance between cell throughput and user fairness. This scheduling policy has been adopted in the majority of proposed NOMA implementations. The scheduling algorithm keeps track of the average throughput $T_k(t)$ of each user in a past window of length $t_c$, where $t_c$ defines the throughput averaging time window (number of simulated subframes). $T_k(t)$ is defined as:

$$T_k(t+1) = \left(1 - \frac{1}{t_c}\right)T_k(t) + \frac{1}{t_c}\sum_{s=1}^{S} R_{s,k}(t) \quad (3)$$

where $R_{s,k}(t)$ represents the achievable throughput of user k on sub-band s, at time instance t. This is calculated based on Eq. (1) above, and can equal zero if user k is not scheduled on sub-band s.

For each sub-band s, all possible candidate user sets are considered, and the set of scheduled users $U_s$ is chosen in such a way to maximize the PF scheduling metric:

$$U_s = \underset{U}{\operatorname{argmax}} \sum_{k \in U} \frac{R_{s,k|U}(t)}{T_k(t)} \quad (4)$$

A difficulty with this approach is that power allocation on the basis for example of the Proportional Fairness calculation depends on knowledge of user throughput on a specified sub-band, which implies that users have already been allocated to particular sub-bands. Meanwhile, in NOMA systems, maximum throughput can generally be achieved where there is the greatest possible difference in transmission power for the users on a given sub-band, so that optimal allocation of users to sub-bands requires knowledge of the power available for each user. Accordingly, the considerations are mutually interdependent. It is desirable to identify a mechanism for resolving this tension and providing a method for a more optimal attribution of power to sub-bands resulting in improved overall data throughput and/or fairness.

SUMMARY OF THE INVENTION

In accordance with a first aspect, there is provided a system for assigning power to each sub-band in a time slot t in a multiple access communications system. The system comprises a coordinator adapted to select sub-bands for consideration in sequence for assignment of one or more users, the users being assigned to respective sub-bands with regard to a respective provisional sub-band power allocation for the sub-band under consideration. The system further comprises a power calculator adapted to determine a provisional partial power budget for a subset of the sub-bands comprising the sub-bands to which users have been assigned in the present time slot and the sub-band under consideration in the sequence, where the fraction of the total available power determined as the provisional partial power budget corresponds to the fraction of the number of sub-bands in the subset from the total number of sub-bands to be assigned, and to determine the provisional sub-band power allocation for the sub-band under consideration, by performing a waterfilling distribution of the provisional partial power budget amongst the subset of the sub-bands, based on the channel gain of the users already assigned to sub-bands in the present time slot.

In accordance with the present invention in a second aspect there is provided a method of assigning power to each sub-band in a time slot t in a multiple access communications system, wherein sub-bands are considered in sequence for assignment of one or more users, the users being assigned to respective sub-bands with regard to a respective provisional sub-band power allocation for the sub-band under consideration. For each new sub-band considered in the sequence, the method comprises the steps of determining a provisional partial power budget for a subset of the sub-bands comprising the sub-bands to which users have been assigned in the present time slot and the sub-band under consideration in the sequence. The fraction of the total available power determined as the provisional partial power budget corresponds to the fraction of the number of sub-bands in the subset from the total number of sub-bands to be assigned. The provisional sub-band power allocation is determined for the sub-band under consideration by performing a waterfilling distribution of the provisional partial power budget amongst the subset of the sub-bands, based on the channel gain of the users already assigned to sub-bands in the present time slot.

In accordance with a development of the second aspect the step of users being assigned to respective sub-bands with regard to a respective provisional sub-band power allocation comprises the calculation of a set maximizing a performance metric reflecting the known throughput, and/or fairness across users.

In accordance with a development of the second aspect the method comprises the further step of calculating a final power allocation for each sub-band from the last iteration of the water filling algorithm corresponding to the combination of users selected for each sub-band.

In accordance with a development of the second aspect the water filling algorithm comprises determining a sub-band attenuation value proportional to the reciprocal of the square of the channel gain value of the user having the highest channel gain assigned to that sub-band, distributing the provisional partial power budget using a floor for each sub-band defined by the respective sub-band attenuation value.

In accordance with a development of the second aspect the method comprises the further steps of determining every possible combination of users assignable to the sub-band under consideration; assessing each possible combination of users assignable to the sub-band under consideration, and attributing to the selected sub-band whichever combination of users optimizes the performance metric.

In accordance with a development of the second aspect the method comprises the further steps of assigning as an initial sub-band assignment a user excluding any user who has already been assigned to an initial sub-band to the sub-band under consideration, as first user for that respective sub-band. A plurality of candidate pairs of users for possible assignment to the sub-band under consideration are determined, with each candidate pair of users comprising two different users including the first user and a candidate second user. The plurality of candidate pairs is restricted to a set of candidate pairs comprising candidate second users whose channel gain is complementary to the channel gain of the first user, and the respective second sub-band is assigned as user as the user excluding any user who has already been assigned to an initial sub-band and maximizing the performance metric reflecting the known throughput, and/or fairness across users.

In accordance with a third aspect there is provided an apparatus adapted to implement the steps of the second aspect.

In accordance with a fourth aspect there is provided a computer program adapted to implement the steps of the second aspect.

In accordance with a fifth aspect there is provided a computer readable medium incorporating the computer program of the fourth aspect.

BRIEF DESCRIPTION OF THE DRAWINGS

The above and other advantages of the present invention will now be described with reference to the accompanying drawings, provided for illustration purposes only, in which.

DETAILED DESCRIPTION

In order to further improve the achieved system throughput in multiple access communications system such as Orthogonal Multiple Access (OMA) and Non-Orthogonal Multiple Access (NOMA), the problem of optimally distributing the total power among sub-bands should be addressed. While the following illustrations and non-limiting examples focus on NOMA implementations by way of non-limiting example, it will be appreciated that other multiple access communications systems may be envisaged in which the same approach is applicable.

The present invention provides an adaptive waterfilling approach, which is useful in many such power distribution scenarios.

Waterfilling based approaches can be seen as analogous to filling a vessel with an uneven floor with water, where the level of the floor for each sub-band is dictated by the channel gain of the sub-band. The "water" poured over this floor is the power to be distributed, and in accordance with the analogy, more power will pool in the areas with a lower floor. Good channels with a high channel gain will have a low floor and as such receive a greater proportion of the available power on this basis.

The power to be distributed in prior art approaches is generally presumed to be the total available transmission power, however in a number of possible implementations, such an approach may be less than optimal. For example, in some cases where sub-bands are treated sequentially, the power distribution may only be performed for the sub-bands to which users, and power, have already been assigned, plus the sub-bands presently under consideration. This will have the effect of exaggerating the power available for assignments for the first channels to be considered, and only give properly representative values once users have been attributed for all sub-bands.

In accordance with the present invention, rather than distributing all of the available power at each iteration, a pro rata proportion of the available power is distributed.

Figure 1:
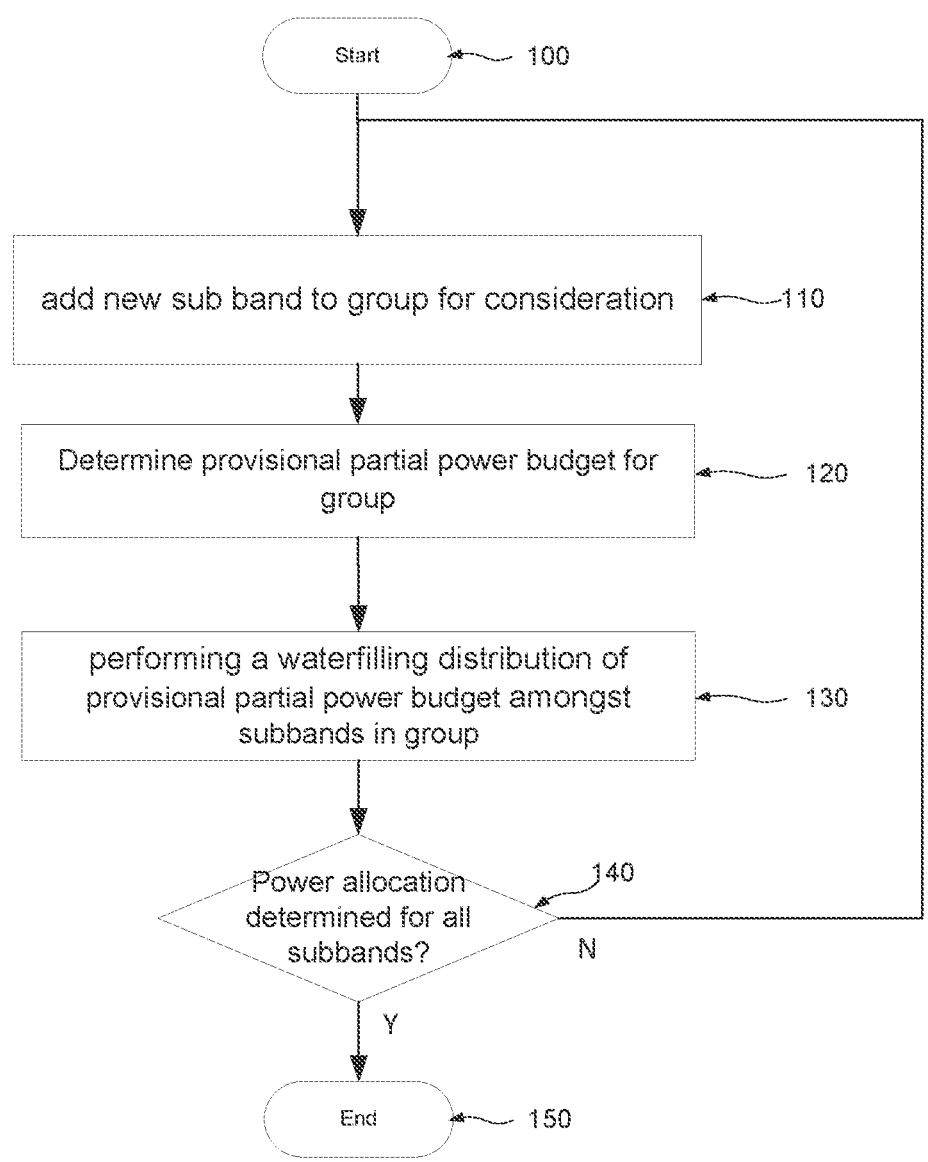
FIG. 1 shows a method of attributing power to each of a plurality of sub-bands in a time slot t in a multiple access communications system in accordance with an embodiment.

FIG. 1 shows a new disclosed method of attributing power to each of a plurality of sub-bands in a time slot t in a multiple access communications system, in accordance with an embodiment.

As shown, the method starts at step 100 before proceeding to step 110 at which a sub-band is added to a group for consideration. The method then proceeds to step 120 at which a provisional partial power budget is determined for the group of sub-bands to be considered, which comprises the sub-bands to which users have been assigned in the present time slot, in previous iterations if any, and the sub-band added for consideration at step 110, where the fraction of the total available power determined as the provisional partial power budget corresponds to the fraction of the number of sub-bands in the subset from the total number of sub-bands to be assigned. The method then proceeds to step 130 at which a provisional sub-band power allocation for the sub-band under consideration is determined by performing a waterfilling distribution of the provisional partial power budget amongst the subset of the sub-bands, based on the channel gain of the users already assigned to sub-bands in the present time slot. The method then proceeds to step 140 at which it is considered whether a power allocation has been performed for all sub-bands. In a case where all sub-bands have been considered the method terminates at step 150, or otherwise reverts to step 110.

As such, there is provided a method of assigning users to each sub-band in a time slot t in a multiple access communications system, wherein sub-bands are considered in sequence for assignment of one or more users, the users being assigned to respective sub-bands with regard to a respective provisional sub-band power allocation for the sub-band under consideration. For each new sub-band considered in the sequence, this method comprises the steps of determining a provisional partial power budget for a subset of the sub-bands, comprising the sub-bands to which users have been assigned in the present time slot and the sub-band under consideration in the sequence, where the fraction of the total available power determined as the provisional partial power budget corresponds to the fraction of the number of sub-bands in the subset from the total number of sub-bands to be assigned, and determining the provisional sub-band power allocation for the sub-band under consideration, by performing a waterfilling distribution of the provisional partial power budget amongst the subset of the sub-bands, based on the channel gain of the users already assigned to sub-bands in the present time slot.

It will be appreciated that, while providing a method of assigning power to sub-bands, the foregoing is silent as to the manner in which users are assigned to those sub-bands, or how power is distributed amongst users within each sub-band. A number of possible approaches to these questions are presented below, by way of non-limiting example.

A waterfilling approach is analogous to filling a vessel with an uneven floor (as dictated by the different sub-band attenuation values) with water. Given a particular volume of water, corresponding to the total transmission power budget, it will naturally find its own level, whereby the depth at any point indicates the power allocation for the underlying sub-band.

This represents a rational mechanism for power distribution since it makes sense to invest the most power in the sub-band with the highest channel gain, and thus the lowest sub-band attenuation value, since allocating on this basis advantageously ensures the highest possible total throughput rates.

An improved waterfilling algorithm in accordance with certain embodiments may be seen as implicitly ensuring that the total power assigned across the carrier under consideration and all other sub-bands to which users have been assigned, is equal to a pro rata proportion of the total power budget, assuming an equal share of power for each sub-band for the total power budget equal to (s×Pmax/S), as discussed above, and such that, for each sub-band considered thus far, the sum of the power provisionally assigned to that sub-band and the sub-band attenuation value of that sub-band is a constant.

Specifically, the waterline level is predicted based on the previous level (as determined for the sub-bands allocated so far) and the channel gain of the considered users scheduled on the current sub-band s.

Maximizing the achieved throughput through an optimal sharing a pro rata proportion of the total transmit power (s×Pmax/S) among s sub-bands may then be achieved if:

$$P_j + \frac{N_0 B/S}{h_{j,k_j^*}^2} = W_s, \quad j = 1 \ldots s \quad (5)$$

where $P_j$ denotes the amount of power allocated to sub-band j, $W_s$ is the waterline at allocation stage s, and $h_{j,k_j^*}$ the channel gain of user $k_j^*$ showing the highest channel gain among scheduled users on sub-band j.

During the allocation process, a pro rata proportion of the total transmit power (s×Pmax/S) is distributed, at each allocation stage s, among allocated sub-bands based on (5), resulting in:

$$\frac{sP_{max}}{S} = \sum_{j=1}^{s}\left(W_s - \frac{N_0 B/S}{h_{j,k_j^*}^2}\right) \quad (6)$$

which can be re-written as:

$$\frac{sP_{max}}{S} = sW_s - \sum_{j=1}^{s}\left(\frac{N_0 B/S}{h_{j,k_j^*}^2}\right) \quad (7)$$

When allocating power to the next sub-band, denoted by s+1, since a proportional amount of total power is re-distributed by the scheduler, the waterline is updated only if $$\frac{N_0 B/S}{h_{s+1,k_{s+1}^*}^2} < W_{s+1},$$

otherwise it will keep its old value and $W_{s+1}=W_s$. When the waterline is updated, a pro rata proportion of the total transmit power (s+1)Pmax/S is distributed at stage s+1. This pro rata fraction of the total available power determined as the provisional partial power budget may correspond to the fraction of the number of sub-bands in the subset from the total number of sub-bands to be assigned. For example, if a channel comprises a total of 8 sub-bands, and users have already been assigned to two sub-bands in previous iterations, in considering the set comprising a third sub-band the provisional partial power budget might be equal to ⅜ of the total available power. On this basis, $$\frac{(s+1)P_{max}}{S} = \sum_{j=1}^{s+1}\left(W_{s+1} - \frac{N_0 B/S}{h_{j,k_j^*}^2}\right) \quad (8)$$

Hence, using equation (7) and equation (8), the following equality holds:

$$sW_s - \sum_{j=1}^{s}\left(\frac{N_0 B/S}{h_{j,k_j^*}^2}\right) + \frac{P_{max}}{S} = (s+1)W_{s+1} - \sum_{j=1}^{s}\left(\frac{N_0 B/S}{h_{j,k_j^*}^2}\right) - \frac{N_0 B/S}{h_{s+1,k_{s+1}^*}^2} \quad (9)$$

Then, the waterline at stage s+1 can be formulated as:

$$W_{s+1} = \left(sW_s + \frac{P_{max}}{S} + \frac{N_0 B/S}{h_{s+1,k_{s+1}^*}^2}\right)\bigg/(s+1)$$

Therefore, at each $s^{th}$ step of the scheduling process, for every candidate user set U, the waterline level is derived from $$W_{s,U} = \left((s-1)W_{s-1,U} + \frac{P_{max}}{S} + \frac{N_0 B/S}{h^2_{s,k^*_{s,U}}}\right)\bigg/s \qquad (10)$$

where $k^*_{s,U}$ is the user showing the highest channel gain among scheduled users in the set U, over sub-band s. Once the waterline level at the actual stages is determined, power may then be provisionally assigned for each candidate set U as $P_{s,U}$ using:

$$P_{s,U} = W_{s,U} - \frac{N_0 B/S}{h^2_{s,k^*_{s,U}}} \qquad (11)$$

Optionally, when it is determined at step 140 that power allocations have been determined for all sub-bands, the further steps of calculating a final power allocation for each sub-band from the last iteration of the water filling algorithm corresponding to the combination of users selected for each sub-band may be performed thereby enabling transmission at the optimized levels.

Figure 2:
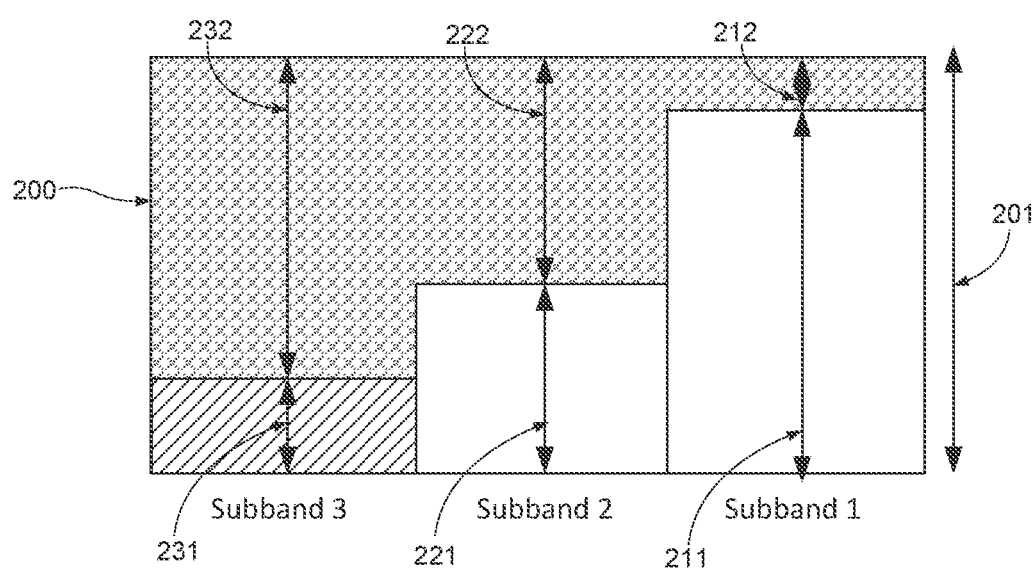
FIG. 2 demonstrates the application of the waterfilling approach, in accordance with the method of FIG. 1.

FIG. 2 demonstrates the application of the water filling approach, in accordance with the method of FIG. 1.

In certain implementations a sub-band attenuation value may be used as an indicator of the channel gain for the candidate set of users is obtained, proportional to the reciprocal of the square of gain of the selected channel, corresponding for each combination to the highest of the channel gain value associated with the users in that candidate set.

As such, in certain variants the water filling algorithm of step 130 may comprise determining a sub-band attenuation value proportional to the reciprocal of the square of the channel gain value of the user having the highest channel gain assigned to that sub-band, and distributing the provisional partial power budget, using a floor for each sub-band defined by the respective sub-band attenuation value.

As shown in FIG. 2, users have been assigned to sub-bands 1 and 2 in previous iterations, and the new sub-band selected for consideration at step 110 is the sub-band 3.

The sub-band attenuation values of each of the sub-bands (the current sub-band sub-band 3, and the two preceding sub-bands, sub-bands 1 and 2) are illustrated arranged next to each other in order of magnitude, with the sub-band having the lowest sub-band attenuation value on the left, and the sub-band having the highest sub-band attenuation value on the right.

As such, in FIG. 2, the current sub-band sub-band 3, having sub-band attenuation value 231 is situated to the left of the other two sub-bands. In accordance with the equations 10 and 11 above, the total power budget can be provisionally distributed amongst the three sub-bands under consideration such that the power assigned to the carrier under consideration and all other sub-bands to which users have been assigned is equal to a pro rata proportion of the total transmit power 3Pmax/S (s=3) is distributed at stage 3, and such that, for each sub-band, the sum of the power provisionally assigned to that sub-band and the sub-band attenuation value of that sub-band is a constant.

Thus, as shown, a first provisional power allocation 212 is implied for sub-band 1, a second provisional power allocation 222 is implied for sub-band 2, and a third provisional power allocation 232 is implied for sub-band under consideration, sub-band 3, such that in each case the sum of each provisional power allocation with the corresponding sub-band attenuation value would be equal to a constant value 201, and the sum of the three values 212, 222, 232 is equal to a pro rata proportion of the total transmit power 3Pmax/S.

As mentioned above, while providing a method of assigning power to sub-bands, the foregoing is silent as to the manner in which users are assigned to those sub-bands, or how power is distributed amongst users within each sub-band. A number of possible approaches to these questions are now presented by way of example.

The step of users being assigned to respective sub-bands with regard to the respective provisional sub-band power allocation may comprise the calculation of a set maximizing a performance metric reflecting the achieved throughput, and/or fairness across users.

Figure 3:
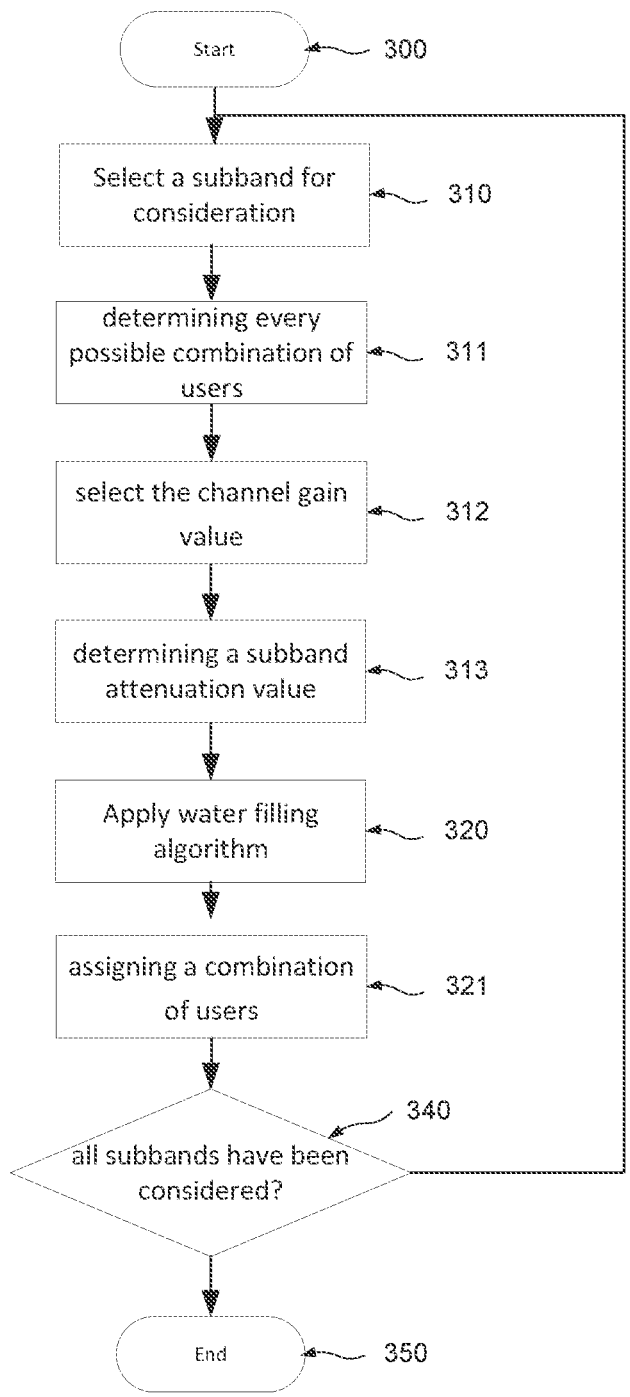
FIG. 3 shows steps of an exemplary method of assigning users to respective sub-bands with regard to the respective provisional sub-band power allocation.

FIG. 3 shows steps of an exemplary method of assigning users to respective sub-bands with regard to the respective provisional sub-band power allocation.

As shown in FIG. 3, the method starts at step 300, before proceeding to step 310 at which a sub-band is selected for consideration. The sub-band selected may be any of the sub-bands defined in the system, since in accordance with the present embodiment the sub-bands may be considered in any order.

From step 310, the method proceeds to step 311, at which every possible combination of users is determined for the sub-band under consideration.

Figure 4:
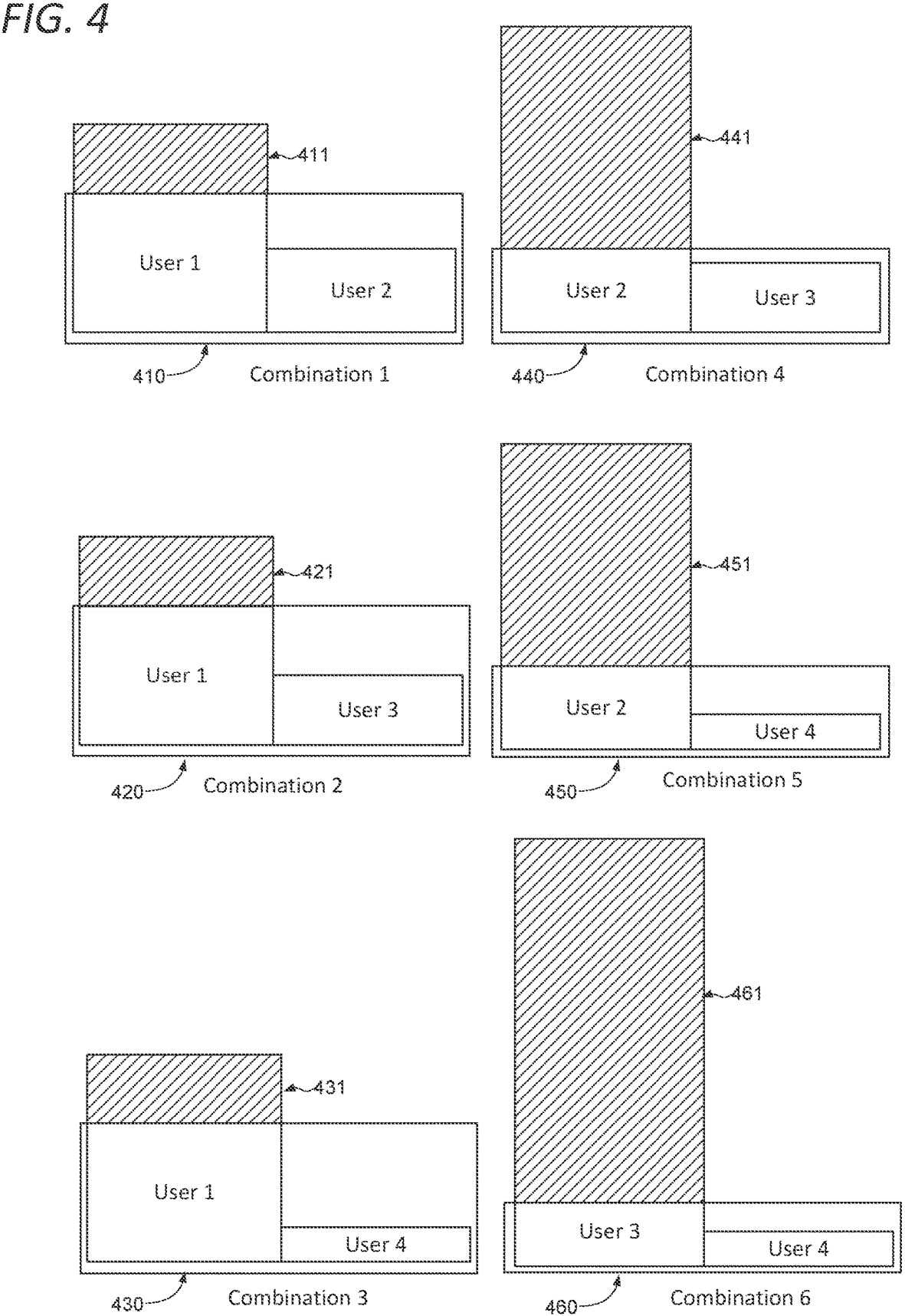
FIG. 4 illustrates the determination of sub-band attenuation values.

As shown in FIG. 4, there are defined 4 users for illustration purposes only. There may indeed be any number of candidate users to consider at this stage.

In some implementations, the number of users that may be assigned to any one sub-band may be fixed or capped, or may be determined freely, in order to optimize a performance metric. In particular, the number of users that might be assigned to any sub-band may be extended beyond two. The waterline calculation will remain the same, based on the highest channel gain among scheduled users for a possible candidate user set. Nevertheless, the number of possible combinations for any sub-band will grow dramatically as the possible number of users per sub-band increases. The gain obtained when 3 users are scheduled per sub-band is around 1% compared to 2 users per sub-band, as demonstrated by Y. Saito, A. Benjebbour, Y. Kishiyama, and T. Nakamura, in "System-level performance evaluation of downlink non-orthogonal multiple access (NOMA)», IEEE PIMRC, September 2013.

In any case, typically two users may be assigned to each sub-band, and for the purposes of the implementation discussed by way of example below, it is assumed that this is the case, for simplification of the description and illustration purposes.

As shown in FIG. 4, each of the users 1, 2, 3 and 4 has a respective channel gain value 401, 402, 403, 404. As shown user 1 has the highest channel gain or "h" value, user 2 has the next highest, user 3 has the next highest and user 4 has the lowest channel gain value. In 3G and 4G systems, a parameter is generally fed back from the receiver to the transmitter with information regarding the quality of the channel. This can be treated in accordance with some embodiments of the present invention as an indicator of the channel gain value, and it is presumed that implementations of NOMA in accordance with the present invention will provide some analogous mechanism. As such, in any embodiment, whilst waterfilling is performed based on the channel gain of the users, this need not depend on an explicit measurement of each user's channel gain, but may also use any value that may be obtained or derived in the system which may be taken as indicative of a respective user's channel gain.

As shown in FIG. 4, if there are four users 1, 2, 3 and 4, of which any two may be assigned to the channel under consideration, there are then six possible combinations: combination 410 comprising user 1 and 2, combination 420 comprising user 1 and 3, combination 430 comprising user 1 and 4, combination 440 comprising user 2 and 3, combination 450 comprising user 2 and 4, and combination 460 comprising user 3 and 4.

In accordance with the method of FIG. 3, the method proceeds from step 311 to step 312 at which the channel gain value of the user in each that combination having the highest channel gain is selected. Thus as shown in FIG. 4, for combination 410 the highest channel gain value 401, corresponding to the channel gain of user 1 is selected, for combination 420 the highest channel gain value 401, corresponding to the channel gain of user 1 is selected, for combination 430 the highest channel gain value 401, corresponding to the channel gain of user 1 is selected, for combination 402 the highest channel gain value 441, corresponding to the channel gain of user 2 is selected, for combination 450 the highest channel gain value 402, corresponding to the channel gain of user 2 is selected, and for combination 460 the highest channel gain value 403, corresponding to the channel gain of user 3 is selected.

On this basis, in certain embodiments where waterfilling is performed on the basis of a sub-band attenuation value as discussed below, a corresponding sub-band attenuation value may be calculated for each combination, reflecting the highest channel gain of the users in that combination. As such, as shown in FIG. 4 the sub-band attenuation value 411 is obtained for combination 1, the sub-band attenuation value 421 is obtained for combination 2, the sub-band attenuation value 431 is obtained for combination 3, the sub-band attenuation value 441 is obtained for combination 4, the sub-band attenuation value 451 is obtained for combination 5, and the sub-band attenuation value 461 is obtained for combination 6.

The example of FIG. 4 is a simplified scenario for the purposes of illustration. In particular, it will be appreciated that, in some cases, any of the users 1, 2, 3, and 4 may be assigned alone to the channel under consideration, which would lead to four additional candidate user sets. This is equivalent to falling back to a pure orthogonal allocation with only one user per sub-band. This guarantees that the obtained system will not show worse performance than the orthogonal case.

The method of FIG. 3 next proceeds from step 312 to step 313 at which a sub-band attenuation value is determined for each combination of users that may be assigned to the channel under consideration.

FIG. 4 illustrates the determination of sub-band attenuation values.

As shown, each combination of users 410, 420, 430, 440, 450, 460 is illustrated, and in each case a respective sub-band attenuation value 411, 421, 431, 441, 451, 461 is shown. This sub-band attenuation value is, in each case, proportional to the reciprocal of the square of the selected channel gain value selected at step 312, corresponding for each combination to the highest of the channel gain values associated with the users in that combination.

Optionally, the sub-band attenuation value may be equal to the total transmission bandwidth multiplied by the Noise power, divided by the square of the selected channel gain value multiplied by the total number of the sub-bands, or $$\frac{BN_0}{Sh_{s,k^*}^2},$$

where $N_0$ is the noise power (equal for all sub-bands) and $h_{s,k^*}$ is the channel gain of the user k* showing the highest channel gain in a given combination of users on the sub-band currently under consideration, s designates a particular sub-band under consideration, and S is the total number of sub-bands.

The method next proceeds from step 313 to step 320, at which a provisional power assignment is calculated for the sub-band under consideration and all other sub-bands to which users have been assigned, for each possible combination of users assignable to the sub-band under consideration. Those computations are made using a water filling algorithm across the selected sub-band and every sub-band selected previously, using a floor for each sub-band defined by the respective sub-band attenuation value as determined at step 313. As such this step corresponds to performing step 120 as described above for multiple candidate pair combinations.

The method now proceeds from step 320 to step 321, at which a combination of users is selected from those considered at step 320.

The determination of throughput values is possible at this step, due to the availability of provisional power allocation values.

Specifically, a performance metric value may be determined for the sub-band under consideration with each possible combination of users assignable to the sub-band under consideration, on the basis of the respective provisional power allocation determined for the sub-band under consideration with each possible combination of users assignable to the sub-band under consideration as determined at step 320.

A variety of performance metrics may be appropriate depending on user and system priorities, for example expressed in terms of fairness, throughput and the like. Suitable performance metrics may be based on throughput predictions on the basis of transmission power allocations. Performance metrics based on fairness may also be suitable. Still further, metrics based on both fairness and throughput may also be appropriate, such as the Proportional Fairness calculation presented above or variants thereof. In applications where fairness maximization is not required, historical rates could be eliminated from the PF metric. The decision metric might then be only based on throughput maximization.

Another possibility is to use capacity limits to predict throughputs using formula 1 and estimate a Proportional Fairness metric as in formula 4.

Accordingly, $P_{s,U}$ is shared among scheduled users in the set U based on Fractional Transmit Power Allocation (FTPA), the scheduling PF metric is calculated. Alternative power repartition mechanisms can also be used, such as a full search power allocation (FSPA) or a fixed power allocation (FPA) as described by Y. Saito, A. Benjebbour, Y. Kishiyama, and T. Nakamura. In "System-level Performance Evaluation of Downlink Non-orthogonal Multiple Access (NOMA). Personal Indoor and Mobile Radio Communications" (PIMRC), pp. 611-615, 2013.

This calculation may be performed for each combination of users, and whichever combination offers the best throughput with the provisional power allocation determined for that combination is selected for definitive assignment to the sub-band under consideration.

Power estimation using equation 11 may only be required at the sub-band selected for consideration, in order to choose the best candidate user set. Powers on the previously allocated sub-bands do not need to be re-estimated at each stage. Power allocation may be performed at the end of the scheduling process (after all sub-bands have been attributed), using the final waterline level, to yield the final users' power levels on all sub-bands. Thereby, at step 321, whichever combination of users provides the best performance metric value is assigned to the sub-band under consideration. Finally, at step 340, it is determined whether all sub-bands in the system have been considered for the assignment of users and allocation of power in accordance with steps 310 to 321 above. And in a case where at least one sub-band has yet to be considered, the method reverts to step 310, at which a new sub-band is selected from those yet to be considered. Otherwise, the method proceeds to terminate at step 350.

It will be appreciated that, while the method of FIG. 3 suggests a parallel processing of the different user combination scenarios in steps 310 to 321, it would be entirely equivalent for any or all of the steps of selecting the channel gain value, determining a sub-band attenuation value, calculating a provisional power assignment, determining a performance metric, to be carried out in sequence for one user combination scenario at a time, and looping back to repeat the same steps for each user combination scenario until all user combination scenarios have been considered.

It will also be appreciated that, while application of the waterfilling algorithm across the sub-bands for which provisional or definitive user attributions are available implies a power attribution for each sub-band, this is not necessarily converted into an actual power value for each sub-band. Implementation of the steps of FIG. 1 or 3 only requires that an actual power value be available for the sub-band under consideration. Definitive power values may then be obtained for all sub-bands, once definitive user attributions have been made, i.e., on the basis of the waterfilling algorithm as performed for the user combination for the last sub-band to be considered. Nevertheless, it is also possible for power values to be obtained each time the waterfilling algorithm is carried out, or each time a combination of users is definitively assigned to a sub-band on the basis of a series of iterations of the waterfilling algorithm.

As such, at the step of calculating a provisional power allocation from the waterfilling algorithm for the selected sub-band, a provisional power allocation may be further calculated for each sub-band selected previously from the waterfilling algorithm.

Alternatively, after the step of attributing to the selected sub-band whichever combination of users optimizes the performance metric, the method may comprise a further step of calculating a provisional power allocation for each sub-band selected previously from the waterfilling algorithm, corresponding to the combination of users selected for each sub-band.

As such, the method of FIG. 1 or 3 may comprise the further steps of determining every possible combination of users assignable to the sub-band under consideration; assessing each possible combination of users assignable to the sub-band under consideration and attributing to the selected sub-band whichever combination of users optimizes the performance metric.

By way of further example, certain further optional implementations of the method of FIG. 1 are discussed below.

Figure 5:
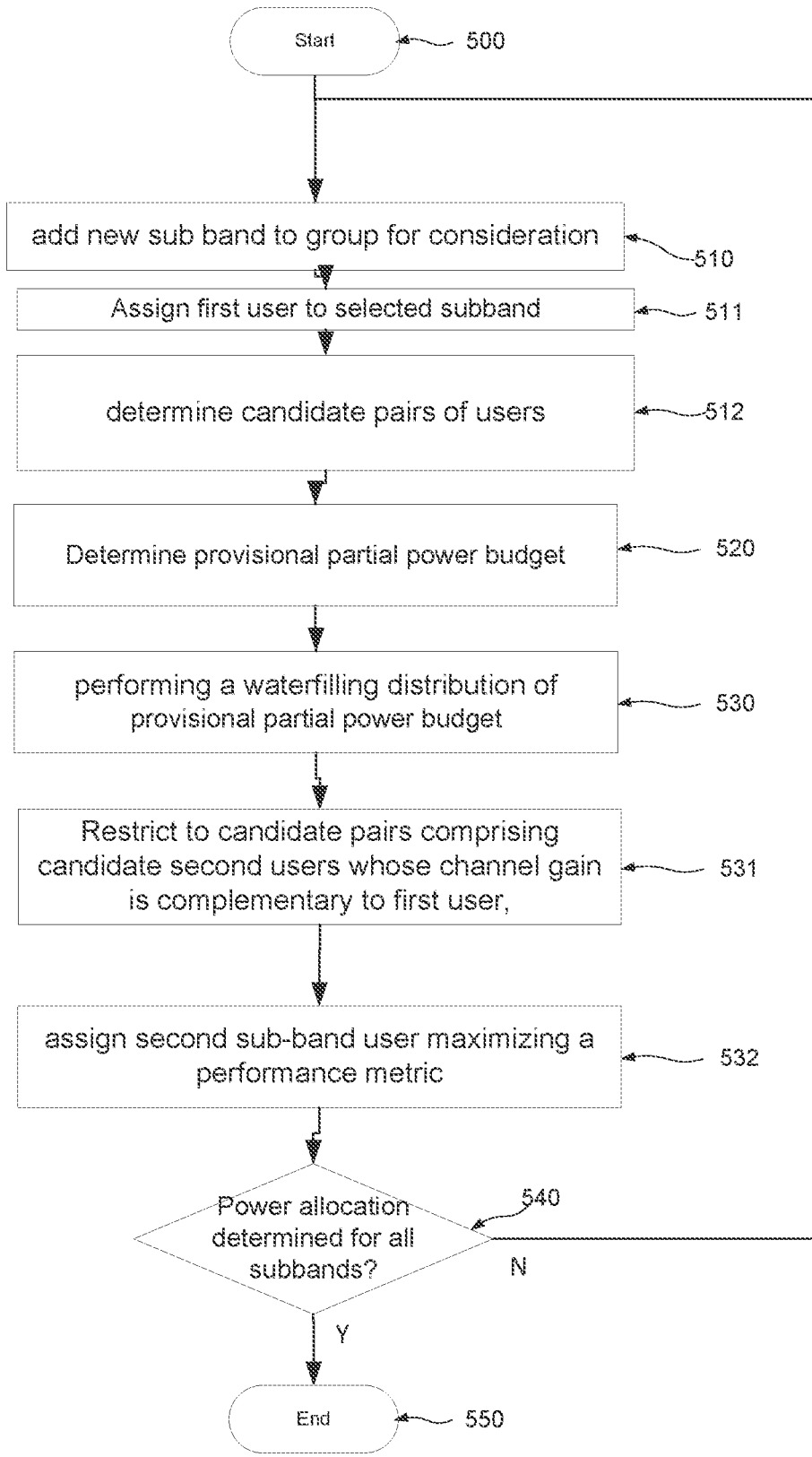
FIG. 5 shows a method of attributing users to one or more of a plurality of sub-bands in a multiple access communications system in accordance with an embodiment.

FIG. 5 shows a method of attributing users to one or more of a plurality of sub-bands in a multiple access communications system in accordance with an embodiment. Specifically there is provided a method of selecting users from a pool of candidate users U for allocation to a plurality of sub-bands in a time slot t in a multiple access communications system.

Access is granted following allocation of resources in time and frequency. Allocation is divided into a number of time slots. The time slot is the elementary time allocation unit in the communication system. For instance, in 4G systems, it is equal to 1 ms. For each time slot, sub-bands are allocated sequentially until the total number of sub-bands per time slot is reached.

This embodiment relates to an initial sub-band assignment for each user. Subsequent sub-band assignments may occur once all users have received an initial assignment in accordance with this embodiment as described with reference to certain further embodiments below. Exemplary details of this approach are presented in more detail below.

As shown in FIG. 5, the method starts at step 500 before proceeding to step 510 at which a new sub-band is added to the group for consideration as discussed above with reference to step 110 of FIG. 1. The method next proceeds to step 511 at which a user is assigned as an initial sub-band assignment to a respective selected sub-band in the current time slot t, as first user for that respective selected sub-band. The user assigned at this step 511 may be any user excluding users who have already been assigned to an initial sub-band.

The user to be assigned at this step 511 may be selected according to a variety of bases. In certain embodiments, the method may comprise a further step of sorting all users in order of priority according to a criterion prior to the step of assigning. On this basis, at step 511, the user assigned may be the user having the highest priority excluding any user who has already been assigned to an initial sub-band to a selected sub-band in a time slot t.

As such, a priority list may be used at the beginning of the allocation process for the selection of the first user on each sub-band. The idea behind this priority list is to have all users granted a sub-band (and some throughput) at least once at the beginning of the allocation process. At the first time slot, the priority list may be created: all the K users are sorted in the Base Station (BS). The users are removed from this priority list as soon as they are selected in step 511. At subsequent time slots, if the priority list is not empty, only the remaining users are sorted again (update of the priority list). The resulting priority list is used while at least one user has not been assigned any sub-band during the assignment process.

In certain further embodiments, this sorting of users in order of priority may comprise sorting the users in order of best channel gain measured for the current time slot for each user across all sub-bands, where the user accorded the highest priority is the user having the lowest best channel gain.

The lowest best channel gain ("lowest best h") sorting provides good performance (in terms of cell-edge user throughput and total cell throughput)—Users may be sorted at the Base Station based on the channel gain experience by users on available sub-bands, $h_{s,k}$ being the channel gain of user k on sub-band s. This may be expressed in the following manner: for each user k, select that user's highest channel gain $h_{s_{best}}$ among the channel gains experienced over all sub-bands. The user with the highest priority is the one having the lowest best channel gain, and vice versa.

In certain further embodiments, the user may be selected at random. This may comprise the further step of sorting all users in order of priority according to a random sorting, which may be performed at a lower processing overhead that other sorting approaches.

Sub-Band Assignment

User 1 ($k_1$) is assigned the sub-band which has the highest value of $h_{s,k1}$ among all the available sub-bands.

In embodiments assigning users from a priority list, at this stage if the priority list is not empty, the assigned user $k_1$ may be removed from the list. Accordingly, the selected sub-band to which the user is assigned as first user at step 511 may be selected as the sub-band to which no first user is currently attributed offering the highest channel gain for that user. Alternatively, the sub-band to which the user is assigned may be selected at random from the sub-bands to which no first user is currently assigned. This may comprise the further step of sorting all users in order of priority according to a random sorting, which may be performed at a lower processing overhead than other sorting approaches.

For the purposes of this description, projected throughput is, for the current time slot, the sum of the achievable throughputs for the user on each sub-band to which the user has been attributed, and known throughput is representative of the average throughput achieved by the user over a predefined historical period, and the known throughput can include the projected throughput or not.

On the basis of these embodiments using a priority list, and considering that when a user is assigned to a sub-band (either as first or second user) that user is removed from the list, the selection of the first user in the initial sub-band assignment phase as discussed above may be described in terms of the priority list not being empty (i.e. all the users have not been assigned a sub-band, or, equivalently, any throughput, yet) in which case the selection of the next user to be assigned to a sub-band as user 1 may be carried out according to the order given by the priority list. Similarly, when the priority list is empty (i.e., all the users have now been assigned a sub-band or equivalently, a non-zero throughput), alternative selection mechanisms may be envisaged as described below.

The method next proceeds from step 511 to step 512, at which a plurality of candidate pairs of users are determined for possible assignment to the selected sub-band, where each candidate pair of users comprises two different users including the first user (as assigned to the sub-band at step 511) and a candidate second user.

At step 520, a provisional power allocation is assigned to the selected sub-band for each candidate pair of users, on the basis of a partial power budget determined for the group as discussed above with respect to step 120 of FIG. 1.

Power may be distributed equally amongst users or other strategies can be applied to the distribution of the power between the users attributed to that sub-band (for example FPA—Fixed power allocation, FTPA—fractional transmit power allocation or Full Search Power Allocation) within a sub-band, all of which are compatible with and encompassed in the present disclosure. In order to further improve the achieved system performance in NOMA, the problem of optimally distributing users among sub-bands should be addressed. This may lead to improved user fairness and/or increase the achieved system throughput.

The achievable throughputs for users $k_1$ and $k_2$ are functions of the power allocated to each user as defined in equation 1 above.

Similarly, the total available transmission power may be distributed between sub-bands by a variety of mechanisms. One example is based on an equal distribution of power. Alternatively, according to certain alternative embodiments, provisional PA may be carried out during the pairing process. This provides an opportunity to attempt to identify an optimal power distribution between the users.

Accordingly, at step 530, power is distributed among sub-bands on the basis of a waterfilling distribution of the partial power budget, as described above with respect to step 130 of FIG. 1.

On this basis, Pmax/S is assigned to a first sub-band and no further inter-sub-band calculation is required for this sub-band. In successive iterations, the inter-sub-band power allocation for the $s^{th}$ sub-band assigned in the time slot (s>1), (s×Pmax/S), is provisionally assigned across the s first sub-bands. In these later iterations, where there are more than one sub-bands to consider, this power is redistributed among all the s sub-bands using the iterative waterfilling procedure as described in more detail below.

Initially, a sub-band attenuation value for each candidate set of users is obtained, proportional to the reciprocal of the square of gain of the selected channel, corresponding for each combination to the highest of the channel gain value associated with the users in that candidate set.

Optionally, the sub-band attenuation value may be equal to the total transmission bandwidth multiplied by the Noise power, divided by the square of the selected channel gain value multiplied by the total number of the sub-bands, or $$\frac{BN_0}{Sh_{s,k^*}^2},$$

where $N_0$ is the noise power (equal for all sub-bands) and $h_{s,k^*}$ is the channel gain of the user k* showing the highest channel gain in a given combination of users on the sub-band currently under consideration, s designates a particular sub-band under consideration, and S is the total number of sub-bands.

The provisional power assignment may then be calculated for the sub-band under consideration. This is calculated using a waterfilling algorithm across the selected sub-band and every sub-band selected previously, using a floor for each sub-band defined by the respective sub-band attenuation value.

At step 531, the plurality of candidates is restricted to a set of candidate pairs comprising candidate second users whose channel gain is complementary to the channel gain of the first user.

A complementary channel gain is a channel gain, such that assigning a user having that channel gain to the selected sub-band together with the corresponding first user, would indicate a total sub-band throughput greater than the sub-band throughput achievable by assigning all available power as indicated by the provisional power allocation for the corresponding candidate pair of users for the respective sub-band to the first user.

In certain embodiments, a complementary second user may be a candidate second user whose channel gain differs from that of the first user $k_1$, taking advantage of the fact that the total throughput in NOMA systems increases with the difference in channel gains of paired users.

Different mechanisms for identifying such complementary users may be envisaged. In a first, "brute force" implementation, the channel gain values may be computed for all the users $k_2$ (excluding the already selected first user $k_1$) for the sub-band s for which the second respective user is to be assigned, and for every candidate second user $k_2$, computing the achievable throughput for $k_1$ and $k_2$ on s.

It will be appreciated that the achievable throughput for $k_1$ and $k_2$ depends on the intra-sub-band and inter sub-band power allocation strategy.

On this basis, only the subset $S_2$ of users $k_2$ need be retained such that the cumulated achievable throughput of $k_1$ and $k_2$ on sub-band s is greater than the throughput of $k_1$ alone (that is, the OMA situation). If no user $k_2$ can satisfy this condition ($S_2=\emptyset$), the method may simply adopt OMA, where user $k_1$ occupies the currently selected sub-band s.

The method of FIG. 5 next proceeds from step 531 to step 532 at which a respective second sub-band user is assigned (as an initial sub-band assignment) to the user, excluding any user who has already been assigned to an initial sub-band, belonging to the set maximizing a performance metric reflecting the known throughput, and/or fairness across users.

Now that a set of complementary pairs of candidate users is available, the method of FIG. 5 may proceed to select one of these candidate pairs of users for the definitive attribution of a selected second candidate user to the selected sub-band.

At step 532, the second sub-band user may be selected as the candidate second user maximizing a metric reflecting the system throughput, subject to a factor reflecting fairness across users.

There exist a variety of metrics suitable for the selection of the second users subject to a factor reflecting fairness across users, examples of which will be presented in the following part of the specification.

A first example of a metric suitable for use at step 532 is termed "Flexible Throughput vs Fairness Maximisation Metric" (FTFMM).

In accordance with the FTFMM metric, a second user $k_2$ is selected that maximizes the metric $$k_2 = \text{Argmax}_{k \in S_2} \frac{R_{s,k}(t) + R_{s,k_1}(t)}{aR_{k,tot}(t) + bR_{k_1,tot}(t)} \quad (12)$$

Where
$R_{s,k}(t)$ (and respectively $R_{s,k_1}(t)$) is the achievable throughput for user k (respectively $k_1$) on sub-band s, when paired with $k_1$ (respectively k).
$R_{k,tot}(t)$ (and respectively $R_{k_1,tot}(t)$) is the known throughput for user k in a past window of length $t_c$ taking account of the projected throughput of user k at time t, $R_k(t)$ (respectively $t,R_{k1}(t)$).

$$R_{k,tot}(t) = \left(1 - \frac{1}{t_c}\right)T_k(t) + \frac{R_k(t)}{t_c}$$

Where $T_k(t)$ is the average throughput of user k in the past window of length $t_c$,
$R_k(t)$ (projected throughput) is the sum of the achievable throughputs for user k on each sub-band to which user k has been attributed in the current time slot.
The maximization of this metric tends to favor the pair of users with a high NOMA throughput and/or with a low known throughput.

Thus the numerator portion represents the NOMA throughput on sub-band s with a given pair of users, and the denominator represents a weighted cumulated known throughput of those same users.

Parameters a and b are optional and may take values between 0 and 1, so as to provide a mechanism for varying the relative importance of fairness on one hand and throughput on the other. The values a and b may have any desired value between 0 and 1, their overall weighting effect being defined by the ratio between the two values.

If a=0, the known throughput of the second candidate user is not accounted for in the metric and the selection of user $k_2$ is only based on the maximization of the NOMA throughput on the current sub-band (since user $k_1$ is fixed).

If b=0, user $k_2$ is selected by taking the NOMA throughput as well as the known throughput of user $k_2$ into consideration. The metric ensures balance between fairness for $k_2$ and NOMA throughput on the current sub-band s.

In other cases (0<a, b<1), the known throughput of user $k_1$ is taken into account in the denominator, reducing the impact of the known throughput of user $k_2$.

The maximization of this metric tends to favor the pair of users with a high NOMA throughput, and/or with a low known throughput and/or with a low throughput loss in NOMA, as compared to an OMA configuration with user $k_1$ alone.

User selection on the basis of the foregoing metrics generally comprises identifying the user minimizing or maximizing the metric. It will be appreciated that since the metrics are presented as one factor divided by another, whether the desired user maximizes or minimizes the metric will depend on which factor is adopted as the numerator and which as the denominator. Generally, this may be referred to as identifying the user giving rise to an extremum in the ratio between the two factors.

As such, this is one example of a metric suitable for use in the selection of the second user for a particular sub-band, wherein the second sub-band user is selected as the candidate second user giving rise to an extremum in a metric reflecting the ratio between total throughput achievable by each pair of users comprising the first user assigned to the sub-band under consideration and a respective candidate second user, and the known throughput achieved by that same pair of users over a predetermined preceding period.

A second example of a metric suitable for use at step 532 is termed "Fairness Maximisation metric" (FMM). In accordance with this metric, the user $k_2$ that minimizes the following metric is selected:

$$k_2 = \text{Argmax}_{k \in S_2} \frac{\sum_{k'=1}^{K} |R_{k',tot}(t) - AVG(t)|}{AVG(t)} \quad (13)$$

$R_{k',tot}$ is the known throughput of user k' in a past window of length $t_c$, taking account of the projected throughput for user k' at time t, $$R_{k',tot}(t) = \left(1 - \frac{1}{t_c}\right)T_{k'}(t) + \frac{R_{k'}(t)}{t_c} \quad (14)$$

If user k' has not been assigned any sub-band in the current allocation time slot t, $$\frac{R_{k'}(t)}{t_c} = 0$$

$$AVG(t) = \frac{1}{K}\sum_{k'=1}^{K} R_{k',tot}(t)$$

is the average value of $R_{k',tot}(t)$, computed over all the users. The minimization of this metric tends to favor user $k_2$, that makes the known throughput of every user as close as possible to the average throughput of all users. Perfect fairness is obtained when the metric is equal to zero.

In equation (13), the candidate second user under consideration k does not explicitly appear in the expressions of the numerator or of the denominator but it actually has an impact on the values of the known throughput values $R_{k',tot}(t)$ and on AVG(t) via the projected throughputs, $R_k(t)$.

Illustrating Examples:
  In case of equal power allocation: only the known throughput values of the candidate second user under consideration k and of the selected first user $k_1$, $R_{k,tot}(t)$ and $R_{k_1,tot}(t)$, depend on the choice of user k;
  In case of iterative waterfilling (as described above): the choice of user k has an impact on $R_{k,tot}(t)$ and $R_{k_1,tot}(t)$ and also on all values of $R_{k',tot}(t)$ for the users k' already allocated in current time slot t.

As such, this is one example of a metric suitable for use in the selection of the second user for a particular sub-band, wherein the second sub-band user is selected as the candidate second user giving rise to an extremum in the matching between the average throughput of each user and the average throughput of all users over a predetermined preceding period.

A third example of a metric suitable for use at step 532 is a variant of the Flexible Throughput vs Fairness Maximisation Metric, wherein the user $k_2$ that minimizes the following metric is selected:

$$k_2 = \underset{k \in S_2}{\text{Argmin}} \frac{\sum_{k'=1}^{K} |R_{k',tot}(t) - AVG(t)|}{R_{s,k}(t) + R_{s,k_1}(t)}$$

The minimization metric tends to favor users $k_2$, that make the known throughput of every user as close to the average throughput of all users and/or with a high NOMA throughput. As such this metric represents a combination of aspects of the preceding metrics, offering a balance between fairness and throughput.

This metric computation requires Power Allocation (PA), provisional or final, depending on the PA Strategy.

As such, this is one example of a metric suitable for use in the selection of the second user for a particular sub-band, wherein the second sub-band user is selected as the candidate second user giving rise to an extremum in a metric reflecting a ratio between the total throughput achievable by each pair of users comprising the first user assigned to the sub-band under consideration and a respective candidate second user, and the sum of deviations of the known throughput of each user over a predetermined preceding period from the average throughput of all users over the predetermined preceding period.

All implementations of the invention advantageously provide significant improvements compared to conventional proportional fairness in NOMA (reaching a Gini fairness of 0.1 in less than 10 ms or less) apart from the FTFMM metric with the a weighting factor set to 0 and the b weighting factor set to 1, which shows a relatively small improvement.

The FTFMM metric with the 'a' weighting factor set to 1 and the 'b' weighting factor set to 0, and the FMM metric show a far smoother, less bursty user throughput level overtime.

It has been shown experimentally by the inventors that implementations of the method of FIG. 1 adopting the FTFMM metric with the 'a' weighting factor set to 0 and the 'b' weighting factor set to 1 provides a dramatic improvement (around 40%) in throughput for all numbers of sub-bands, while adopting the FTFMM metric with the 'a' weighting factor set to 0.5 and the 'b' weighting factor set to 0.5, or the 'a' weighting factor set to 1 and the 'b' weighting factor set to 0 offer some improvement (around 10%) whilst the FMM metric provides less important improvements compared to conventional proportional fairness. The same general distributions are the same when considering throughput for different numbers of users, although performance differences are limited with small numbers of users (10 in the experiments), they grow very quickly when adopting the FTFMM metric with the 'a' weighting factor set to 0 and the 'b' weighting factor set to 1 for larger user counts.

Naturally, the values obtained in different configurations may vary on the basis of system configuration and other experimental conditions.

Although as discussed above a certain number of exemplary metrics have been presented, it will be appreciated that many variants of these general approaches may be envisaged, any of which may be chosen, based on the relevant importance of different operational parameters in a particular implementation.

As shown in FIG. 5 the method next determines at step 540 whether all sub-bands have been considered and in a case where sub-bands remain to be considered, reverting to step 510, or otherwise terminating at step 550. On this basis, the method may be optionally considered to comprise the further steps of then repeating the steps of assigning a first user to a selected sub-band, provisionally assigning a power allocation to the selected sub-band, and assigning a second user to the selected sub-band, until all sub-bands in the current time slot have been attributed.

The method of FIG. 5 of attributing users to one or more of a plurality of sub-bands in a multiple access communications system achieves fairness among users in any time scale of interest and reduces the convergence time towards a required fairness performance, with short-term fairness being achieved, which is particularly beneficial when quasi-constant user rate is required, requires no deep buffering and is compatible with low-latency constraints. Furthermore, it provides higher total cell throughput than the classic PF scheduler. It can be associated with unequal power allocation techniques such as waterfilling. For NOMA schemes, this solution advantageously offers a reduction of the number of tested user pairs for each sub-band attribution, leading to a complexity decrease compared to PF.

As mentioned above, the embodiment of FIG. 5 relates to an initial sub-band assignment for each user. Subsequent sub-band assignments occurring once all users have received an initial assignment may then occur, according to a further mechanism. This may occur in a context where user 1 is selected among the set of users that need to communicate as the user experiencing the lowest total achieved throughput, or alternatively where user 1 is selected among the set of users that need to communicate as the user experiencing the largest distance between its projected throughput and its target throughput.

In either case, on this basis where, at step 532, the set of assignable users is empty, no second user is assigned to the sub-band corresponding to the empty set, and user assignment for the selected sub-band is considered to be complete on the basis of the assignment of the first user alone.

On this basis, once user assignment is considered to be complete for all sub-bands for the current time slot, in a case where some users have not yet been assigned to any sub-band as an initial time slot assignment, the method may comprise the further steps of continuing to repeat the steps of assigning as an initial sub-band assignment a first user to the selected sub-band, provisionally assigning a power allocation to the selected sub-band, and assigning a second user as an initial sub-band assignment to the selected sub-band and selecting a new sub-band for successive time slots, until all users have been assigned to a sub-band.

As mentioned above, the embodiment of FIG. 5 relates to an initial sub-band assignment for each user. Subsequent sub-band assignments occurring once all users have received an initial assignment may then occur according to a further mechanism. In particular, once all users have been assigned to a sub-band as an initial sub-band assignment, any remaining sub-bands in the current time slot, and each sub-band in subsequent time slots may be assigned as a first user the user having the lowest total known throughput, wherein each user is assigned to the remaining sub-band to which no first user is currently attributed offering the highest channel gain for that user. This approach may be applicable in particular where users are not assigned throughput targets.

Alternatively, once all users have been assigned to an initial sub-band, for any remaining sub-bands in the current time slot and each sub-band in subsequent time slots, a user may be assigned as first user whose known total throughput is furthest from a respective target throughput defined for that user, wherein each user is assigned to the remaining sub-band to which no first user is currently attributed offering the highest channel gain for that user. This approach may be applicable in particular where users are assigned throughput targets.

The separate treatment of initial sub-band allocation advantageously helps ensure that all users are served quickly, thereby reducing service latency in a quasi-optimal way. After this initial phase, users may be served according to the system/user requirements for example on a best effort or target throughput basis. The initial phase as described above allows the short-term fairness to be improved and the subsequent phase helps guarantee a high throughput and a good long-term fairness.

The method may comprise an additional step of assigning a final power allocation to each user of each sub-band. This may be performed for example for each sub-band once all user allocations are complete for that sub-band in the current time slot. The final power allocation may be performed by a final iteration of the waterfilling method as described above.

There may be provided a further step of computing a final real throughput value for each sub-band on the basis of the respective first and second users assigned thereto and the final power allocation for that sub-band, and comparing this final real throughput with the throughput achievable by each respective user alone on each respective sub-band, and in a case where a respective final real throughput is less than the throughput achievable by the respective user alone on any respective sub-band, revoking the second user assigned to that respective sub-band and allocating all power available for that sub-band to the respective first user.

Accordingly, there is provided a method comprising the further steps of:

- assigning as an initial sub-band assignment a user excluding any user who has already been assigned to an initial sub-band to the sub-band under consideration, as first user for that respective sub-band,
- determining for the sub-band under consideration a plurality of candidate pairs of users for possible assignment to the to the sub-band under consideration, each candidate pair of users comprising two different users including the first user and a candidate second user,
- restricting the plurality of candidate pairs to a set of candidate pairs comprising candidate second users whose channel gain is complementary to the channel gain of the first user, and
- assigning the respective second sub-band user as the user excluding any user who has already been assigned to an initial sub-band and maximizing the performance metric reflecting the known throughput, and/or fairness across users.

As such, in accordance with certain embodiments, there are provided method and system for assigning power to sub-bands in a multiple access communications system, where users are assigned iteratively to sub-bands, and at each iteration a provisional partial power budget is determined for the subset of sub-bands comprising the sub-bands to which users have been assigned in the present time slot and the sub-band under consideration in the sequence, where the fraction of the total available power determined as the provisional partial power budget corresponds to the fraction of the number of sub-bands in the subset from the total number of sub-bands to be assigned, and the provisional power allocation for the sub-band under consideration is obtained by performing a waterfilling distribution of the provisional partial power budget amongst the subset of the sub-bands, based on the channel gain of the users already assigned to sub-bands in the present time slot. Attribution of power to sub-bands on this basis tends to improve overall data throughput and/or fairness.

While certain exemplary embodiments based on the adaptive waterfilling algorithm of FIG. 1 have been presented above with regard to FIGS. 3 and 5, it will be appreciated that the underlying steps will be applicable in many other contexts as may readily occur to the skilled person, including any context where user assignment requires an estimation of the allocated power. While the foregoing examples relate primarily to NOMA contexts, it will be appreciated that the present invention is equally applicable to OMA implementations.

Figure 6:
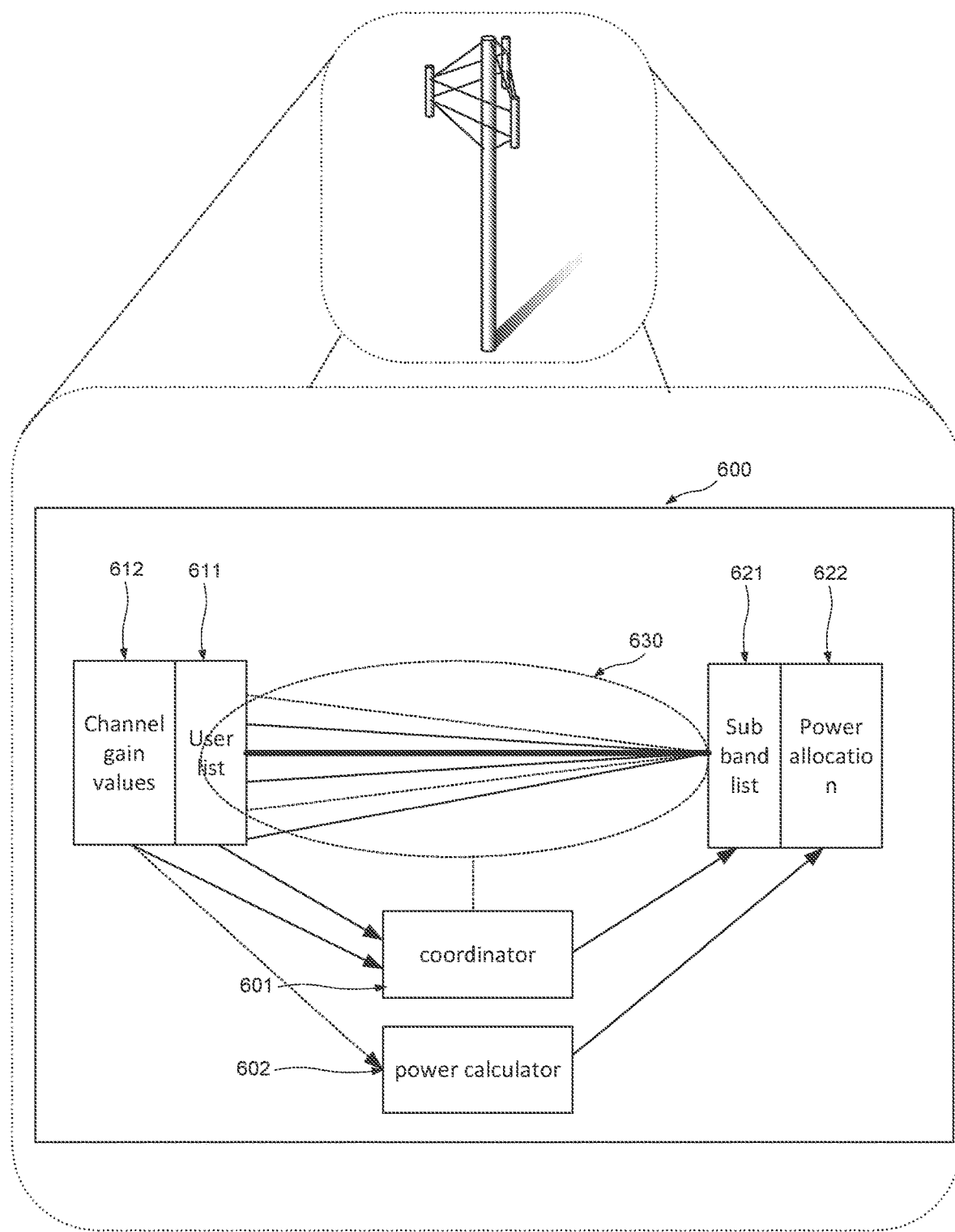
FIG. 6 shows a system according to an embodiment.

FIG. 6 shows a system according to an embodiment. As shown, there is provided a system 600 for assigning power to each sub-band in a time slot t in a multiple access communications system. The system comprises a coordinator 601 adapted to select sub-bands, which as shown are enumerated in a sub-band list 621, for consideration in sequence for assignment of one or more users, which as shown are enumerated in a user list 611. The users are assigned 630 by the coordinator to respective sub-bands with regard to a respective provisional sub-band power allocation for the sub-band under consideration 622. The system 600 further comprises a power calculator 602 adapted to determine a provisional partial power budget for a subset of sub-bands comprising the sub-bands to which users have been assigned in the present time slot and the sub-band under consideration in the sequence as designated by the coordinator 601, where the fraction of the total available power determined as the provisional partial power budget corresponds to the fraction of the number of sub-bands in the subset from the total number of sub-bands to be assigned. The power calculator 602 is further adapted to determine the provisional sub-band power allocation for the sub-band under consideration, by performing a waterfilling distribution of the provisional partial power budget amongst the subset of the sub-bands, based on the channel gain 612 of the users already assigned to sub-bands in the present time slot.

It will be appreciated that alternative functional groupings may be envisaged, implementing equivalent operations.

By way of example, the system of FIG. 6 is represented as being associated with a cellular telephone tower, e.g. a base transceiving station. The skilled person will appreciate that equivalent functionality might equally be implemented in a communications device such as a telephone hand set, or in other parts of the communications network such as a Base station controller, mobile switching center, and so on.

It will be appreciated that the system of FIG. 6 or any equivalent functional grouping may further be adapted to implement the functions corresponding to any combination of the method steps described above with reference to any of FIGS. 1 to 5.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Accordingly, a mechanism is proposed based on iteratively applying a waterfilling algorithm to distribute power across a progressive subset of sub-bands to provisionally distribute the power budget across that subset of sub-bands, where at each iteration the water filling algorithm is carried out for each possible combination of users assignable to the newly considered sub-band using a floor for that sub-band proportional to the reciprocal of the square of the highest channel gain value of any user in that combination, and calculating a throughput for that combination with the corresponding power attribution, whereby the combination retained for the next iteration (with an additional sub-band) is whichever optimizes a performance metric. This process is thus repeated until users are assigned to all sub-bands, whereupon a definitive power allocation is calculated from the last iteration of the water filling algorithm.

These methods and processes may be implemented by means of computer-application programs or services, an application-programming interface (API), a library, and/or other computer-program product, or any combination of such entities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for assigning power to each sub-band in a time slot t in a multiple access communications system,
the system comprising a coordinator adapted to select sub-bands for consideration in sequence for assignment of one or more users, the users being assigned by said coordinator to respective sub-bands with regard to a respective provisional sub-band power allocation for the sub-band under consideration,
the system further comprising a power calculator adapted to determine a provisional partial power budget for a subset of sub-bands comprising the sub-bands to which users have been assigned in a present time slot and the sub-band under consideration in the sequence,
where a fraction of a total available power determined as the provisional partial power budget corresponds to the fraction of a number of sub-bands in the subset from a total number of sub-bands to be assigned, and
to determine the provisional sub-band power allocation for the sub-band under consideration, by performing a waterfilling distribution of the provisional partial power budget amongst the subset of sub-bands, based on a channel gain of the users already assigned to sub-bands in the present time slot.

2. A method of assigning power to each sub-band in a time slot t in a multiple access communications system, wherein sub-bands are considered in sequence for assignment of one or more users, the users being assigned to respective sub-bands with regard to a respective provisional sub-band power allocation for the sub-band under consideration,
wherein for each new sub-band considered in the sequence, the method comprises the steps of:
determining a provisional partial power budget for a subset of sub-bands comprising the sub-bands to which users have been assigned in a present time slot and the sub-band under consideration in the sequence, where a fraction of a total available power determined as the provisional partial power budget corresponds to a fraction of a number of sub-bands in the subset from a total number of sub-bands to be assigned,
and determining the provisional sub-band power allocation for the sub-band under consideration, by performing a waterfilling distribution of the provisional partial power budget amongst the subset of the sub-bands, based on a channel gain of the users already assigned to sub-bands in the present time slot, wherein the step of users being assigned to respective sub-bands with regard to a respective provisional sub-band power allocation comprises a calculation of a set maximizing a performance metric reflecting a known throughput, and/or fairness across users.

3. The method of claim 2, comprising the further step of calculating a final power allocation for each sub-band from the last iteration of a waterfilling algorithm corresponding to a combination of users selected for each sub-band.

4. The method of claim 2, wherein the water-filling algorithm comprises:
   determining a sub-band attenuation value proportional to the reciprocal of the square of the channel gain value of the user having the highest channel gain assigned to that sub-band, and
   distributing the provisional partial power budget, using a floor for each the sub-band defined by the respective sub-band attenuation value.

5. The method of claim 2, comprising the further steps of:
   determining every possible combination of users assignable to the sub-band under consideration,
   assessing each possible combination of users assignable to the sub-band under consideration, and
   attributing to the selected sub-band whichever combination of users optimizes the performance metric.

6. The method of claim 2, comprising the further steps of:
   assigning as an initial sub-band assignment a user excluding any user who has already been assigned to an initial sub-band to the sub-band under consideration, as first user for that respective sub-band,
   determining for the sub-band under consideration a plurality of candidate pairs of users for possible assignment to the sub-band under consideration, each candidate pair of users comprising two different users including the first user and a candidate second user,
   restricting the plurality of candidate pairs to a set of candidate pairs comprising candidate second users whose channel gain is complementary to the channel gain of the first user, and
   assigning a respective second sub-band user as the user excluding any user who has already been assigned to an initial sub-band and maximizing the performance metric reflecting the known throughput, and/or fairness across users.

7. An apparatus adapted to implement the steps of claim 2.

8. A non-transitory computer readable medium having instructions that when executed on a computer implement the method according to claim 2.

* * * * *